(12) United States Patent
Bhushan et al.

(10) Patent No.: US 7,382,744 B2
(45) Date of Patent: Jun. 3, 2008

(54) SYSTEMS AND METHODS FOR OPTIMIZING THE ALLOCATION OF RESOURCES TO SERVE DIFFERENT TYPES OF DATA FLOWS IN A WIRELESS COMMUNICATION SYSTEM

(75) Inventors: Naga Bhushan, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 11/045,199

(22) Filed: Jan. 27, 2005

(65) Prior Publication Data
US 2006/0164990 A1 Jul. 27, 2006

(51) Int. Cl.
*H04Q 7/00* (2006.01)
(52) U.S. Cl. ............... 370/328; 370/235; 370/229; 455/561; 455/550.1
(58) Field of Classification Search .......... 370/328, 370/235, 229; 455/561, 550.1
See application file for complete search history.

(56) References Cited

U.S. PATENT DOCUMENTS

| | | | |
|---|---|---|---|
| 5,101,501 A | 3/1992 | Gilhousen et al. | |
| 6,385,462 B1 | 5/2002 | Baum et al. | 455/522 |
| 6,993,006 B2* | 1/2006 | Pankaj | 370/342 |
| 7,154,872 B2* | 12/2006 | Hsuan | 370/335 |
| 7,173,947 B1* | 2/2007 | Ramakrishnan et al. | 370/537 |
| 2003/0198204 A1* | 10/2003 | Taneja et al. | 370/332 |
| 2004/0032835 A1 | 2/2004 | Ahy et al. | 370/252 |
| 2005/0054359 A1* | 3/2005 | Ishii et al. | 455/513 |
| 2005/0123138 A1* | 6/2005 | Abe et al. | 380/255 |
| 2006/0046671 A1* | 3/2006 | Kondo et al. | 455/146 |
| 2006/0182022 A1* | 8/2006 | Abedi | 370/229 |

OTHER PUBLICATIONS

International Search Report (6 pgs.), May 2006.

* cited by examiner

*Primary Examiner*—Danh Le
(74) *Attorney, Agent, or Firm*—Dang M. Vo; Howard Seo; Thomas R. Rouse

(57) ABSTRACT

Systems and methods for optimizing the allocation of resources to serve different types of data flows in a wireless communication system are disclosed. An exemplary method involves calculating data metrics for data in a plurality of queues. Each queue corresponds to a different data flow in the wireless communication system. The data metrics are used to determine a separate transmission metric for each of a plurality of possible transmission formats. The transmission metric for a given transmission format is dependent on the data metrics corresponding to allocated data for the given transmission format. A transmission format is selected that has an optimum transmission metric. The allocated data for the selected transmission format is transmitted on the forward link in accordance with the selected transmission format.

23 Claims, 8 Drawing Sheets

430

| Queue | Allocated Bits | | | | |
|---|---|---|---|---|---|
| | Transmission Format 1 | Transmission Format 2 | ... | Transmission Format $j$ | ... |
| 1 | $b_{11}$ | $b_{12}$ | ... | $b_{1j}$ | ... |
| 2 | $b_{21}$ | $b_{22}$ | ... | $b_{2j}$ | ... |
| ... | ... | ... | ... | ... | ... |
| $i$ | $b_{i1}$ | $b_{i2}$ | ... | $b_{ij}$ | ... |
| ... | | ... | ... | ... | ... |

634

| Bit | Queue $i$ | | | | |
|---|---|---|---|---|---|
| | Transmission Format 1 | Transmission Format 2 | ... | Transmission Format $j$ | ... |
| 1 | $\alpha_{i,1,1}$ | $\alpha_{i,2,1}$ | ... | $\alpha_{i,j,1}$ | ... |
| 2 | $\alpha_{i,1,2}$ | $\alpha_{i,2,2}$ | ... | $\alpha_{i,j,2}$ | ... |
| 3 | $\alpha_{i,1,3}$ | $\alpha_{i,2,3}$ | ... | $\alpha_{i,j,3}$ | ... |
| ... | ... | ... | ... | ... | ... |

| Transmission Format | Transmission Metric |
|---|---|
| 1 | $M_1(t)$ |
| 2 | $M_2(t)$ |
| ... | ... |
| j | $M_j(t)$ |
| ... | ... |

FIG. 7

SYSTEMS AND METHODS FOR OPTIMIZING THE ALLOCATION OF RESOURCES TO SERVE DIFFERENT TYPES OF DATA FLOWS IN A WIRELESS COMMUNICATION SYSTEM

BACKGROUND

1. Field

The present invention relates generally to wireless communications systems, and more specifically, to systems and methods for optimizing the allocation of resources to serve different types of data flows in a wireless communication system.

2. Background

In a wireless communication system, data that is transmitted from a transmitter to a remote station may be associated with different types of applications. Some of these applications may be throughput intensive but delay tolerant. Other applications may have low throughput but may be highly delay sensitive. As a result, it is desirable to meet the diverse needs of applications that are residing on remote stations that are receiving data over the air from a base station. It is desirable to allocate resources at the base station in an optimum manner so as to cater to the needs of these applications to the maximum extent possible, while consuming as few resources as possible. Accordingly, benefits may be realized by systems and methods for optimizing the allocation of resources to serve different types of data flows in a wireless communication system.

SUMMARY

A base station that is configured for wireless communication with a plurality of remote stations in a wireless communication system is disclosed. The base station includes a transmitter for transmitting a forward link to the plurality of remote stations. The base station also includes a processor and memory in electronic communication with the processor. Instructions are stored in the memory. The instructions are executable to implement a method that involves calculating data metrics for data in a plurality of queues. Each queue corresponds to a different data flow in the wireless communication system. The method also involves using the data metrics to determine a separate transmission metric for each of a plurality of possible transmission formats. The transmission metric for a given transmission format is dependent on the data metrics corresponding to allocated data for the given transmission format. The transmission metric for a given transmission format may also be dependent on a penalty associated with the given transmission format. The method also involves selecting a transmission format that has an optimum transmission metric. The allocated data for the selected transmission format may be transmitted on the forward link in accordance with the selected transmission format.

In some embodiments, the allocated data for a given transmission format is determined so that the transmission metric for the transmission format is optimized in view of one or more constraints. The one or more constraints may include a packet capacity constraint which specifies that the allocated data for the transmission format does not exceed a packet's data capacity. In some embodiments the method may also involve selecting the allocated data for the given transmission format so that the transmission metric is optimized without violating the packet capacity constraint.

The one or more constraints may also include an addressing constraint which specifies that the allocated data for the transmission format does not exceed a packet's addressing capacity. In some embodiments the method may also involve determining that an addressing constraint is violated and, in response, adjusting the allocated data so that the transmission metric is optimized without violating either the addressing constraint or the packet capacity constraint.

A separate bit metric may be calculated for each bit in each of the plurality of queues. The bit metric of a given bit in a given queue may be dependent on an arrival time of the given bit, a deadline of the given bit, an average throughput experienced by the given queue, and an average throughput desired by the given queue.

In some embodiments, the method may be performed at each transmission opportunity. The wireless communication system may operate in accordance with the 1xEV-DO standard.

Another embodiment of a base station that is configured for wireless communication with a plurality of remote stations in a wireless communication system is also disclosed. The base station includes means for calculating data metrics for data in a plurality of queues. Each queue corresponds to a different data flow in the wireless communication system. The base station also includes means for using the data metrics to determine a separate transmission metric for each of a plurality of possible transmission formats. The transmission metric for a given transmission format is dependent on the data metrics corresponding to allocated data for the given transmission format. The base station also includes means for selecting a transmission format that has an optimum transmission metric. The base station also includes means for transmitting the allocated data for the selected transmission format on the forward link in accordance with the selected transmission format.

A method in a base station that is configured for wireless communication with a plurality of remote stations in a wireless communication system is also disclosed. The method involves calculating data metrics for data in a plurality of queues. Each queue corresponds to a different data flow in the wireless communication system. The method also involves using the data metrics to determine a separate transmission metric for each of a plurality of possible transmission formats. The transmission metric for a given transmission format is dependent on the data metrics corresponding to allocated data for the given transmission format. The method also involves selecting a transmission format that has an optimum transmission metric. The method also involves transmitting the allocated data for the selected transmission format on the forward link in accordance with the selected transmission format.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 6 illustrates metrics that may be calculated for the data in a queue;

FIG. 7 illustrates transmission metrics that may be calculated for each possible transmission format;

DETAILED DESCRIPTION

Figure 1:
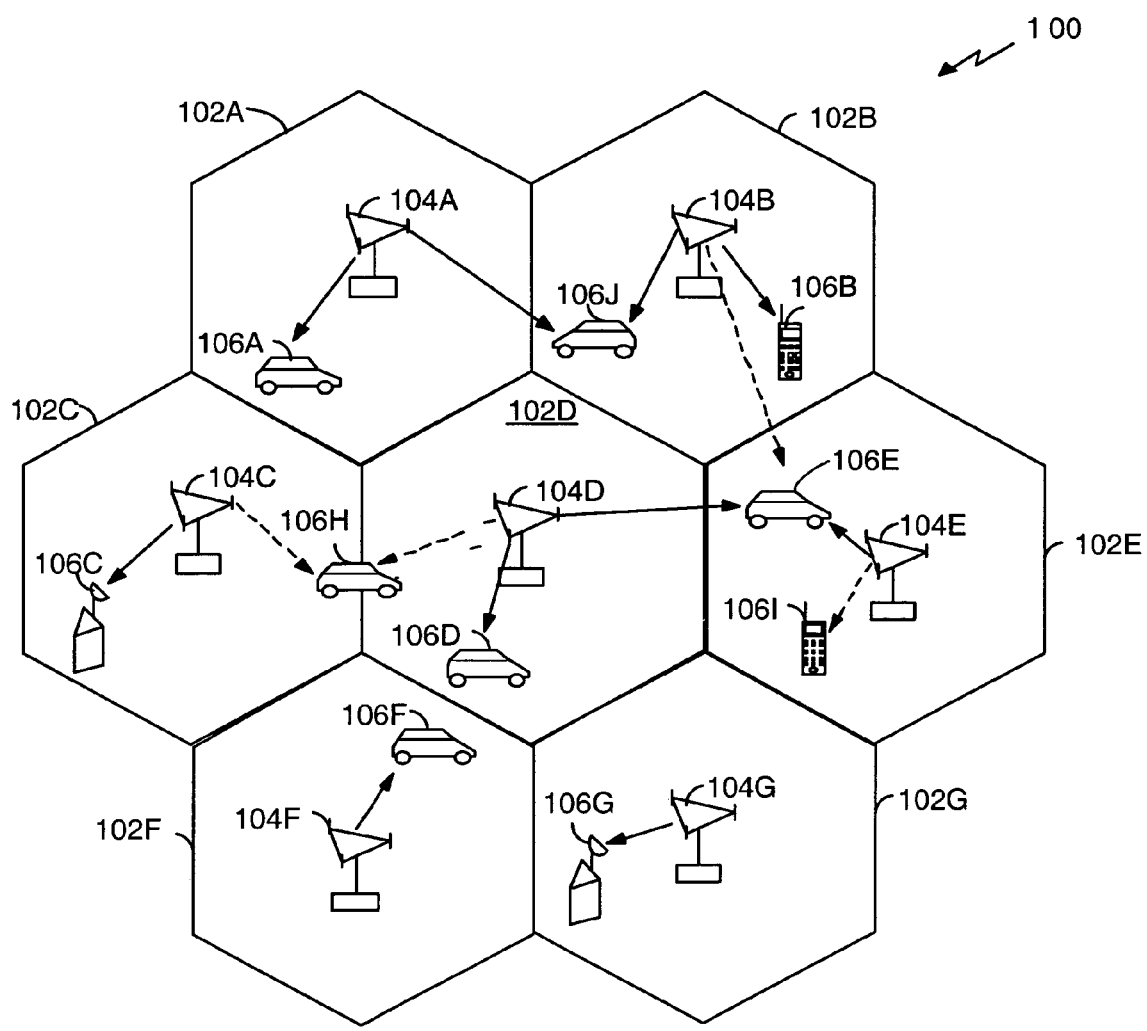
FIG. 1 illustrates an example of a communications system that supports a number of users and is capable of implementing at least some aspects of the embodiments discussed herein.

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as Code Division Multiple-Access (CDMA), Time Division Multiple-Access (TDMA), Frequency Division Multiple-Access (FDMA), and Amplitude Modulation Multiple-Access (AM).

A multiple-access communication system may be a wireless or wire-line and may carry voice and/or data. In a multiple-access communication system, communications between users are conducted through one or more base stations. A first user on one subscriber station communicates to a second user on a second subscriber station by transmitting data on a reverse link to a base station. The base station receives the data and may route the data to another base station. The data is transmitted on a forward channel of the same base station, or the other base station, to the second subscriber station. The forward channel refers to transmission from a base station to a subscriber station and the reverse channel refers to transmission from a subscriber station to a base station. Likewise, the communication may be conducted between a first user on one mobile subscriber station and a second user on a landline station. A base station receives the data from the user on a reverse channel, and routes the data through a Public Switched Telephone Network (PSTN) to the second user. In many communication systems, e.g., IS-95, W-CDMA, IS-2000, the forward channel and the reverse channel are allocated separate frequencies.

The word "exemplary" is used herein to mean "serving as an example, instance, or illustration." Any embodiment described herein as "exemplary" is not necessarily to be construed as preferred or advantageous over other embodiments.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, a mobile IP network and any other system desiring to receive and process a wireless signal.

The exemplary embodiment employs a spread-spectrum wireless communication system. Wireless communication systems are widely deployed to provide various types of communication such as voice, data, and so on. These systems may be based on Code Division Multiple Access (CDMA), Time Division Multiple Access (TDMA), or some other modulation techniques. A CDMA system provides certain advantages over other types of systems, including increased system capacity.

A wireless communication system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3GPP TS 25.211, 3GPP TS 25.212, 3GPP TS 25.213, and 3GPP TS 25.214, 3GPP TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

The systems and methods described herein may be used with high data rate (HDR) communication systems. An HDR communication system may be designed to conform to one or more standards such as the "cdma2000 High Rate Packet Data Air Interface Specification," 3GPP2 C.S0024-A, Version 1, March 2004, promulgated by the consortium "3rd Generation Partnership Project 2." The contents of the aforementioned standard are incorporated by reference herein.

An HDR subscriber station, which may be referred to herein as an Access Terminal (AT), may be mobile or stationary, and may communicate with one or more HDR base stations, which may be referred to herein as Modem Pool Transceivers (MPTs). An access terminal transmits and receives data packets through one or more modem pool transceivers to an HDR base station controller, which may be referred to herein as a Modem Pool Controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or landline phone. The communication channel through which the access terminal sends signals to the modem pool transceiver is called a reverse channel. The communication channel through which a modem pool transceiver sends signals to an access terminal is called a forward channel.

FIG. 1 illustrates an example of a communications system 100 that supports a number of users and is capable of implementing at least some aspects of the embodiments discussed herein. Any of a variety of algorithms and methods may be used to schedule transmissions in the system 100. The system 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Remote stations 106 in the coverage area may be fixed (i.e., stationary) or mobile. As shown in FIG. 1, various remote stations 106 are dispersed throughout the system 100. Each remote station 106 communicates with at least one and possibly more base stations 104 on the forward channel and the reverse channel at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System," which is assigned to the assignee of the present invention.

The forward channel refers to transmission from the base station 104 to the remote station 106, and the reverse channel refers to transmission from the remote station 106 to the base station 104. In the exemplary embodiment, some of the remote stations 106 have multiple receive antennas and others have only one receive antenna. In FIG. 1, base station 104A transmits data to remote stations 106A and 106J on the forward channel, base station 104B transmits data to remote stations 106B and 106J, base station 104C transmits data to remote station 106C, and so on.

Figure 2:
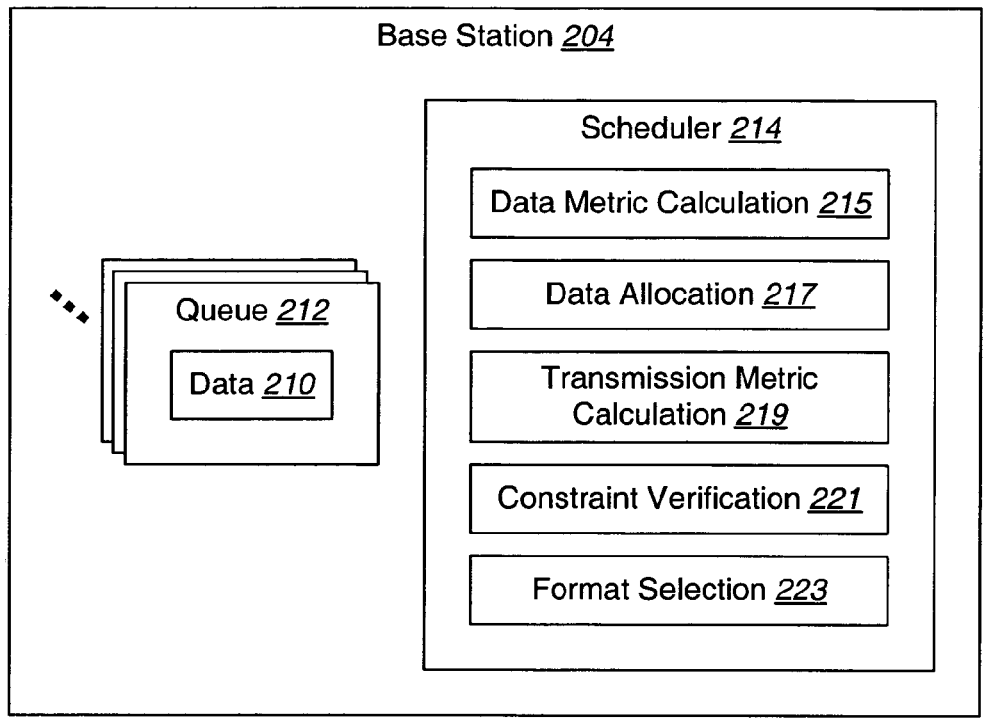
FIG. 2 illustrates an exemplary system in which some embodiments may be practiced.
Figure 2:
Figure 2:
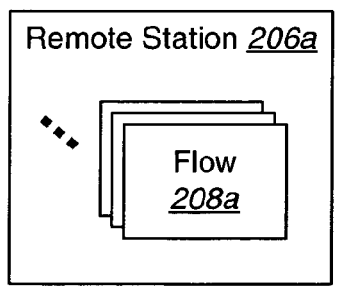
Figure 2:
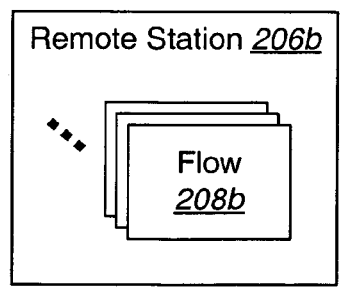
Figure 2:
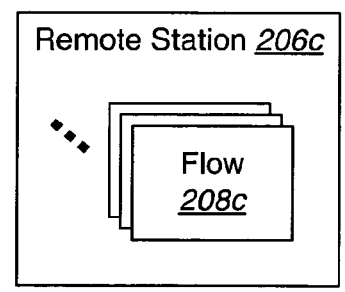

FIG. 2 illustrates an exemplary system 200 in which some embodiments may be practiced. The system 200 includes a base station 204 and one or more remote stations 206. Three remote stations 206 are shown in FIG. 2, a first remote station 206a, a second remote station 206b, and a third remote station 206c. Each remote station 206 includes one or more data flows 208. More specifically, the first remote station 206a includes a first set of data flows 208a, the second remote station 206b includes a second set of data flows 208b, and the third remote station 206c includes a third set of data flows 208c. A data flow 208 is a stream of data that may correspond to a specific application, such as voice over IP, video telephony, file transfer protocol, gaming, etc.

The base station 204 includes data 210 for transmission on the forward link to some or all of the data flows 208 in the system 200. The base station 204 maintains a queue 212 for each data flow 208 in the system 200. The data 210 that is destined for a particular data flow 208 is included in that data flow's queue 212.

At any transmission opportunity (e.g., time slot), the base station 204 may start transmission of new data 210 using one of several transmission formats. A transmission format specifies how channel resources such as code-space, bandwidth, power, etc., are allocated among different data flows 208 who might be served during that transmission opportunity. A transmission format also specifies the structure (e.g., packet size, encoding, modulation, etc.) of packet(s) that are used to carry data in that transmission format.

The base station 204 includes a scheduler 214. At each transmission opportunity, the scheduler 214 selects the transmission format that is used to transmit data 210 on the forward link. The scheduler 214 also determines a data allocation for different data flows 208 within the packet(s) associated with the transmission format. The transmission format and the data allocation for different data flows 208 may be thought of collectively as a "transmission instance." The scheduler 214 selects the transmission format and determines the data allocation so as to optimize the allocation of system 200 resources to serve different types of data flows 208 within the system 200. Various exemplary embodiments of the scheduler 214 will be described below.

The embodiment of the scheduler 214 shown in FIG. 2 uses data metrics to determine the transmission format that is used and the data allocation for the different data flows for the packet that is transmitted. The scheduler 214 includes a data metric calculation component 215. At each transmission opportunity, the data metric calculation component 215 calculates a data metric for each unit of data (e.g., bit) in each queue 212 and for each possible transmission format. The metric calculated for a particular unit of data represents the reward associated with transmitting that unit of data on the forward link.

The scheduler 214 also includes a data allocation component 217 and a transmission metric calculation component 219. For each transmission format that may be used in the next transmission opportunity, the data allocation component 217 allocates data 210 from the different queues 212 for transmission and the transmission metric calculation component 219 calculates a transmission metric. The transmission metric for a particular transmission format is dependent on the sum of the data metrics of the data 210 that is allocated for transmission. The data allocation component 217 allocates data 210 to be transmitted according to a particular transmission format so as to maximize the transmission metric for that transmission format.

Certain constraints of the system 200 may influence the allocation of data 210. For example, the amount of data 210 (e.g., number of bits) included in a packet transmitted on the forward link may not exceed the packet's capacity to carry data 210. As another example, the data 210 included in a packet transmitted on the forward link may not exceed the packet's capacity to address multiple data flows 208 and/or multiple remote stations 206. As yet another example, the data 210 included in a packet may not exceed the amount of data 210 available for transmission. These are just a few examples of constraints that may be associated with the system 200.

The scheduler 214 also includes a constraint verification component 221. The constraint verification component 221 verifies the data allocations for the possible transmission formats are consistent with one or more constraints of the system 200, such as those mentioned above. If the constraint verification component 221 determines a data allocation for a particular transmission format violates one or more of the constraints of the system 200, then the data allocation component 217 adjusts the data allocation for the transmission metric to be maximized without violating the constraints.

The scheduler 214 also includes a format selection component 223. Once the transmission metrics for the possible transmission formats have been calculated, the format selection component 223 selects the transmission format having the maximum transmission metric. The data allocated for that transmission format is then transmitted on the forward link in accordance with that transmission format.

Figure 3:
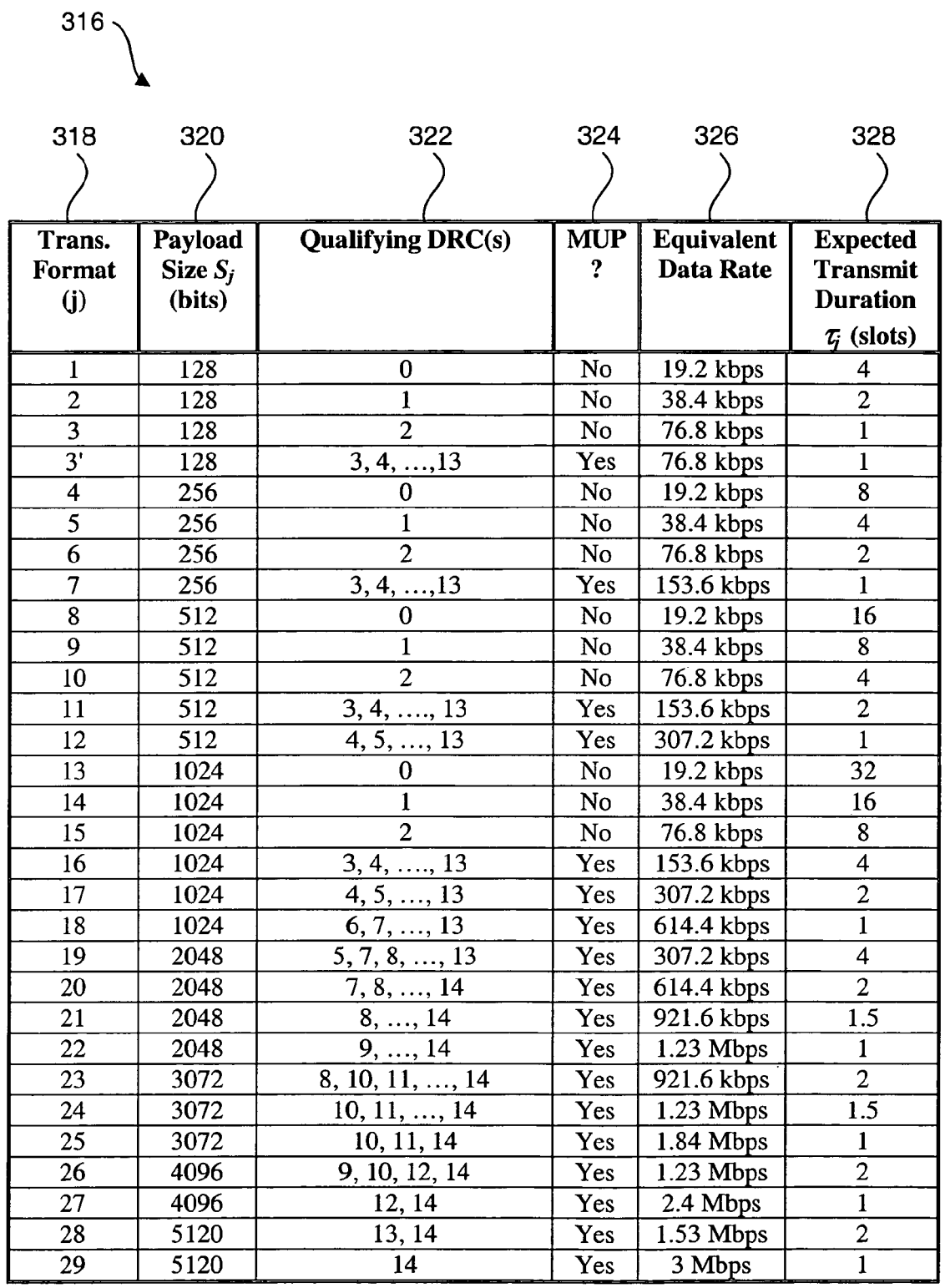
FIG. 3 illustrates information about the available transmission formats that may be used to transmit data on the forward link.

FIG. 3 illustrates information about the available transmission formats that may be used to transmit data on the forward link. The information may be used at and/or stored by the base station 204. In the illustrated embodiment, the information is presented in the form of a table 316. However, in other embodiments, the information may be arranged in a different way. Also, the information presented relates to the 1xEV-DO Rev-A forward link. However, embodiments may be practiced in other types of wireless communication systems.

Each row in the table 316 corresponds to a different possible transmission format. There are six columns in the table 316. The first column 318 in the table 316 is an index for the transmission format. The second column 320 in the table 316 is a payload size for the packet that is created in accordance with the transmission format.

The third column 322 in the table 316 indicates the Data Rate Control (DRC) values that the transmission format is compatible with. The DRC is a signal that is sent from a remote station 206 to the base station 204. The value of the DRC indicates which transmission formats the remote station 206 is capable of receiving given its channel conditions. For example, if the remote station 206 sends a DRC of "0" to the base station 204, the remote station 206 is capable of receiving packet types corresponding to transmission formats 1, 4, 8 and 13. As another example, if the remote station 206 sends a DRC of 1 to the base station 204, the remote station 206 is capable of receiving packet types corresponding to transmission formats 2, 5, 9 and 14.

The fourth column 324 in the table 316 indicates whether the packet corresponding to the transmission format is a multi-user packet. A multi-user packet is a packet that contains data 210 from queues 212 possibly belonging to multiple remote stations 206. In some embodiments, the DRCs from 0-2 are not compatible with a multi-user packet, and the DRCs from 3-13 are compatible with a multi-user packet.

The fifth column 326 in the table 316 indicates the equivalent data rate of the packet corresponding to the transmission format. The sixth column 328 in the table 316 indicates the expected transmit duration of the packet corresponding to the transmission format.

Figures 4, 5:
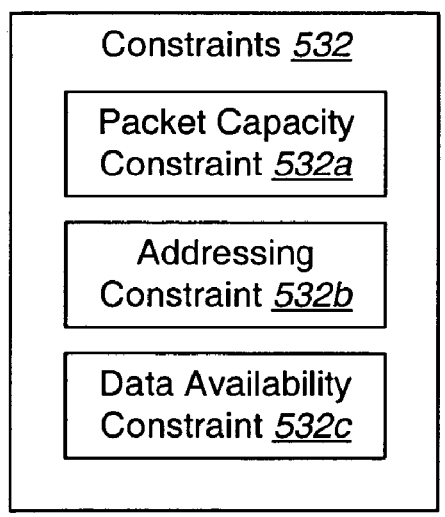
FIG. 4 illustrates possible data allocations for different data flows within the system.
FIG. 5 illustrates constraints that may influence the allocation of data for transmission on the forward link.

FIG. 4 illustrates possible data allocations for different data flows 208 within the system 200. In the illustrated embodiment, the information is presented in the form of a table 430. However, in other embodiments, the information may be arranged in a different way.

The table 430 includes a separate row for each queue 212 that is maintained by the base station 204. As indicated above, the base station 204 maintains a queue 212 for each data flow 208 in the system 200. The table 430 includes a separate column for each possible transmission format that may be used.

The letters i and j will be used herein as indices for the queues and the transmission formats, respectively. Thus, cell $b_{ij}$ of the table 430 includes the number of bits are allocated from queue i if transmission format j is used to transmit the next packet.

The scheduler 214 builds and/or updates the table 430 at the start of each transmission opportunity. There are several factors that influence the value of the bit allocation $b_{ij}$. One factor is the DRC that is being received from the remote station 206. If transmission format j is not compatible with the DRC value that is being received from the remote station 206, none of the data 210 in queue i is allocated for transmission. However, if transmission format j is compatible with the DRC value that is being received from the remote station 206, all of the data 210 in queue i may be allocated for transmission, subject to certain other factors.

Other factors that influence the bit allocation $b_{ij}$ include certain constraints. FIG. 5 illustrates constraints 532 that may influence the bit allocation $b_{ij}$ in some embodiments.

The constraints 532 may include a packet capacity constraint 532a. The packet capacity constraint 532a specifies that the amount of data 210 (e.g., number of bits) that is included in a packet transmitted on the forward link does not exceed the packet's capacity to carry data 210. In some embodiments, the packet capacity constraint 532a may be expressed as:

$$\left\{ (b_1, b_2, \ldots, b_N) \,\middle|\, \sum_{i=1}^{N} \frac{b_i}{G_{i,j}} \leq 1 \right\} \tag{1}$$

In some embodiments, the term $b_i$ in equation 1 indicates the number of bits that are allocated to the $i^{th}$ queue for transmission format j. In such embodiments, there are N data flows (and therefore N queues) in the system 200. The term $G_{i,j}$ indicates the maximum amount of data from data flow i that may be carried for transmission format j if all the channel resources are allocated to that data flow.

Alternatively, in some embodiments, the term $b_i$ in equation 1 indicates the bits allocated to all the data flows residing at the $i^{th}$ remote station. In such embodiments, there are N remote stations in the system 200. The term $G_{i,j}$ indicates the maximum amount of data for remote station i that may be carried for transmission format j if all the channel resources are allocated to data flows residing on remote station i.

The constraints 532 may also include an addressing constraint 532b. The addressing constraint 532b specifies that the data 210 that is included in a packet transmitted on the forward link does not exceed the packet's capacity to address multiple data flows 208 and/or multiple remote stations 206. In some embodiments, the addressing constraint 532b may be expressed as:

$$\left\{ (b_1, b_2, \ldots, b_N) \,\middle|\, \sum_{i=1}^{N} \left\lceil \frac{b_i}{B_{i,j}} \right\rceil \leq K_j \right\} \quad (2)$$

In some embodiments, the term $b_i$ in equation 2 indicates the number of bits that are allocated to the $i^{th}$ queue for transmission format j. In such embodiments, the term $B_{i,j}$ represents the data size at which a given data flow may have to be treated as multiple virtual data flows (for the purpose of addressing, etc.) for a packet that is transmitted in accordance with transmission format j. The term $K_j$ denotes the maximum number of virtual data flows that may be served at a time by transmission format j.

Alternatively, in some embodiments, the term $b_i$ in equation 2 may indicate the bits allocated to all the data flows residing at the $i^{th}$ remote station. In such embodiments, the term $B_{i,j}$ represents the data size at which a given remote station may have to be treated as multiple virtual remote stations (for the purpose of addressing, etc.) for a packet that is transmitted in accordance with transmission format j. The term $K_j$ denotes the maximum number of virtual remote stations that may be served at a time by transmission format j.

The constraints 532 may also include a data availability constraint 532c. The data availability constraint 532c specifies that the data 210 that is included in a packet does not exceed the amount of data 210 that is available. In some embodiments, the data availability constraint 532c may be expressed as:

$$\{(b_1, b_2, \ldots, b_N) | 0 \leq b_i \leq Q_i\} \quad (3)$$

The term $Q_i$ represents the total queue size of the $i^{th}$ data flow. Of course, other constraints 532 in addition to those shown here may be associated with some systems in which embodiments are practiced.

At each transmission opportunity, the scheduler 214 calculates metrics for the data 210 in a particular queue 212. The metric calculated for a particular unit of data represents the reward associated with transmitting that unit of data on the forward link. The metrics are used to determine the transmission format that is used and the data allocation for the different data flows for the packet that is transmitted.

FIG. 6 illustrates metrics that may be calculated for the data 210 in a queue 212. In the illustrated embodiment, the information is presented in the form of a table 634. However, in other embodiments, the information may be arranged in a different way.

In the illustrated embodiment, the scheduler 214 calculates a separate metric for each bit in each queue 212 and for each transmission opportunity. The metric calculated for a particular bit will be referred to herein as a "bit metric."

The table 634 includes the bit metrics that are calculated for the $i^{th}$ queue 212. A similar table 634 may be created for each queue 212 that is maintained by the base station 204 (i.e., for each data flow 208 in the system 200). The table 634 may be created and/or updated for each queue 212 at the start of a transmission opportunity. The table 634 includes a separate row for each bit in the queue, and a separate column for each possible transmission format.

For each bit, the scheduler 214 calculates a bit metric $\alpha(t)$ for each of the possible transmission formats. The term $\alpha_{i,j,k}(t)$ refers to the bit metric for the $k^{th}$ bit in the $i^{th}$ data flow's queue at time t, with respect to transmission format j.

In some embodiments, the bit metric $\alpha_{i,j,k}(t)$ may be expressed as:

$$\alpha_{i,j,k}(t) = \left[ \frac{F(T_{i,k}(t) - T_{desired,i,k}, R_i(t))}{\tau_{i,j}} + G(t + \tau_{i,j} - \tau_{Expedite,i,k}, t + \tau_{i,j} - t_{Arrival,i,k}) \right] \cdot U(\tau_{DROP,i,k} - t - \tau_{i,j}) \quad (4)$$

The term $t_{Arrival,i,k}$ is the arrival time of data bit k of data flow i. The arrival time is the time at which the given bit as well as the data ahead of it in the queue 212 are available for transmission. The term $t_{DROP,i,k}$ is the deadline of data bit k of data flow i. The deadline is the time beyond which the given bit is not needed at the remote station 206. The term $\tau_{Expedite,i,k}$ is the expedite time of data bit k of data flow i. The expedite time is the time after which the delivery of the data bit at the remote station 206 acquires high priority. The expedite time of data bit k is designed to be sufficiently smaller than the deadline of that bit as well as the deadline of all the data behind that bit in the queue 212. The term $T_{i,k}(t)$ is the average throughput experienced by the queue 212 containing the given bit. The term $T_{desired,i,k}$ is the average throughput desired by the queue 212 containing the given bit. The term $R_i(t)$ is the average sustainable data rate/CQI of the $i^{th}$ data flow's channel, based on DRC/CQI feedback received from the data flow. The term $G(x, y)$ is an increasing function of two arguments x and y. The term $U(.)$ is the unit step function.

Data with a bit-metric of zero may be discarded from the queue 212. Hence, the step function multiplier in equation (4) allows data to be discarded once they are past their deadline.

A reasonable choice for the function $F(.\,,\,.)$ is:

$$F(T - T_{desired}, R) = \frac{1}{\max(T - T_{desired}, T_{\min})} \quad (5)$$

A reasonable choice of the function $G(x, y)$ is:

$$G(x,y) = K \cdot U(x) + L \cdot (y - \Delta) U(y - \Delta) \quad (6)$$

The metrics that are calculated for the data 210 in a queue 212 are used to determine transmission metrics for each possible transmission format. A separate transmission metric is calculated for each possible transmission format. This is shown in FIG. 7.

In the table 736 shown in FIG. 7, there is a separate row for each transmission format. The first column 738 of the table 736 includes the possible transmission formats. The second column 740 of the table 736 includes the transmission metric that is calculated for the corresponding transmission format. Thus, the transmission metric $M_j(t)$ refers to the transmission metric that is calculated for transmission format j.

In some embodiments, the transmission metric for transmission format j may be expressed as:

$$M_j(t) \equiv \sum_{i=1}^{N} \sum_{k \in \{k_1, k_2, \ldots, k_{b_i}\}} \alpha_{i,j,k}(t) - P_j \quad (7)$$

The term $\alpha_{i,j,k}(t)$ refers to the bit metric for the $k^{th}$ bit in the $i^{th}$ data flow's queue at time t, with respect to transmission format j, as discussed above. The term $P_j$ is a penalty associated with transmission format j.

In the 1xEV-DO system, the penalty $P_j$ associated with a given transmission format j depends on whether the packet would be used in the multi-user transmission format or single-user transmission format. If the packet is used in the multi-user transmission format, the packet may be assessed a penalty of the form $P_j=A*W_i$, where $W_i$ denotes the number of remote stations whose DRC is compatible with the multi-user packet represented by the transmission format but who do not have any data allocated in that multi-user packet. If the packet is used in the single-user transmission format, no penalty is assessed.

The inner summation k in equation 7 is over all bits from the $i^{th}$ data flow that are allocated for transmission in the given transmission instance. Thus, the transmission metric $M_j(t)$ is dependent on the sum of all bit metrics of the data that is allocated for transmission. For a given transmission format j, the scheduler 214 allocates bits from the queues 212 so as to maximize the transmission metric $M_j(t)$ for that transmission format without violating any of the constraints 532 discussed earlier.

Once the transmission metrics $M_j(t)$ for the possible transmission formats have been calculated, the scheduler 214 then selects the transmission format that has the optimum transmission metric. The data that has been allocated for that transmission format is then transmitted on the forward link in a packet that is consistent with that transmission format.

Figure 8:
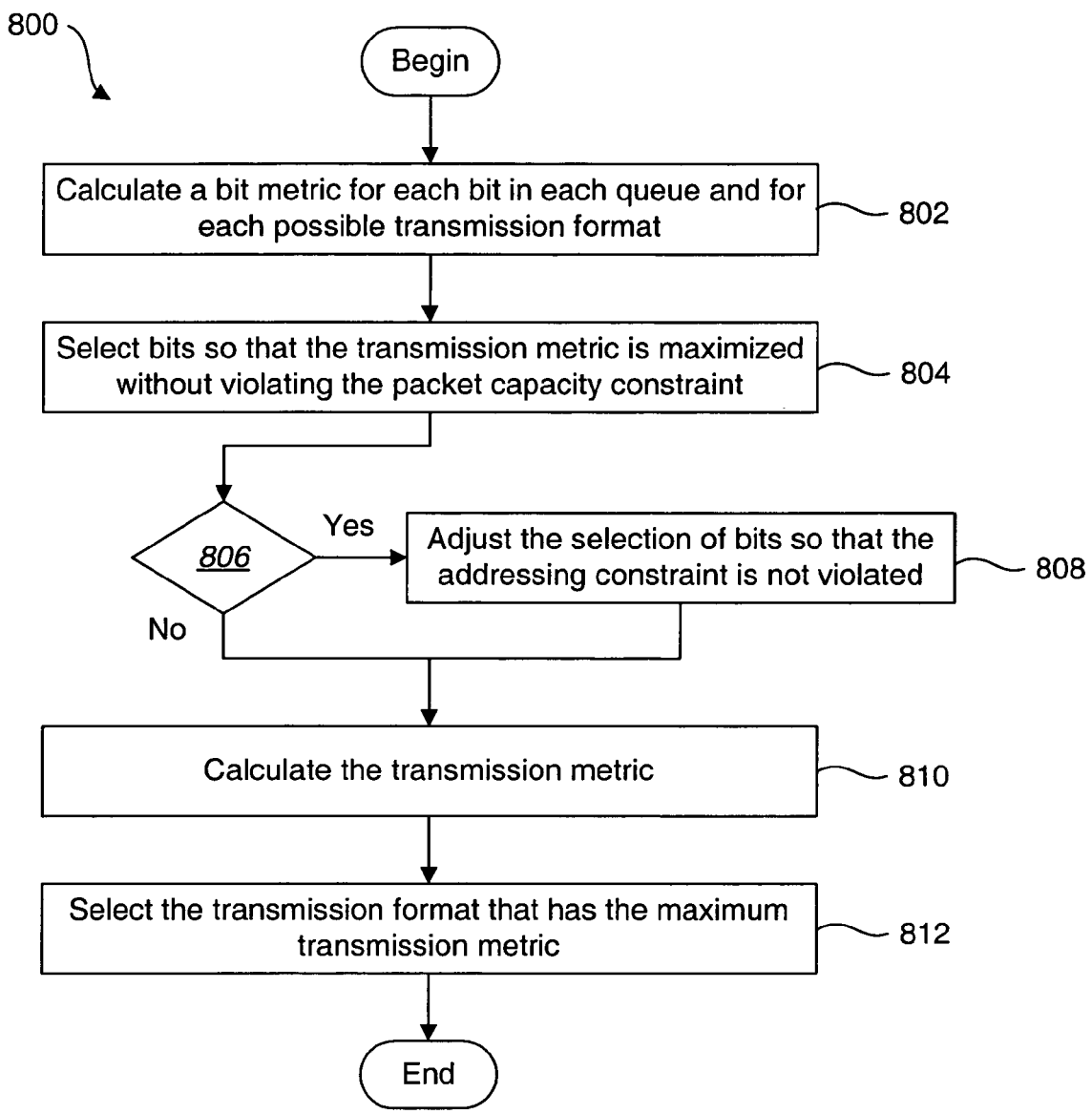
FIG. 8 illustrates an exemplary method that may be performed by the scheduler.

FIG. 8 is a flow diagram which illustrates how the components in the base station 204 may operate to implement a method 800 for optimizing the allocation of resources to serve different types of data flows in a wireless communication system. The steps of the method 800 may be implemented in software, firmware, hardware, or any combination thereof.

The data metric calculation component 215 calculates, at step 802, a bit metric for each bit in each queue and for each possible transmission format. This was discussed above in connection with FIG. 6.

Steps 804 through 810 of the method 800 are performed for each transmission format j that may be used in the next transmission opportunity. The data allocation component 217 selects, at step 804, bits so that the transmission metric is maximized without violating the packet capacity constraint 532a. An exemplary way to perform step 804 will be discussed below.

The constraint verification component 221 determines, at step 806, whether the addressing constraint 532b is violated. If not, the method 800 proceeds to step 810. If the addressing constraint 532b is violated, then the data allocation component 217 adjusts, at step 808, the selection of bits so that the transmission metric is maximized without violating the addressing constraint 532b. An exemplary way to perform step 808 will be discussed below.

The transmission metric calculation component 219 calculates, at step 810, the transmission metric for the transmission format. An exemplary formula for calculating the transmission metric was provided above in equation 7 and discussed in connection therewith.

The format selection component 223 selects, at step 812, the transmission format that has the maximum transmission metric. The data that is selected for that transmission format in steps 804 through 808 is then transmitted on the forward link in accordance with that transmission format.

Figure 9:
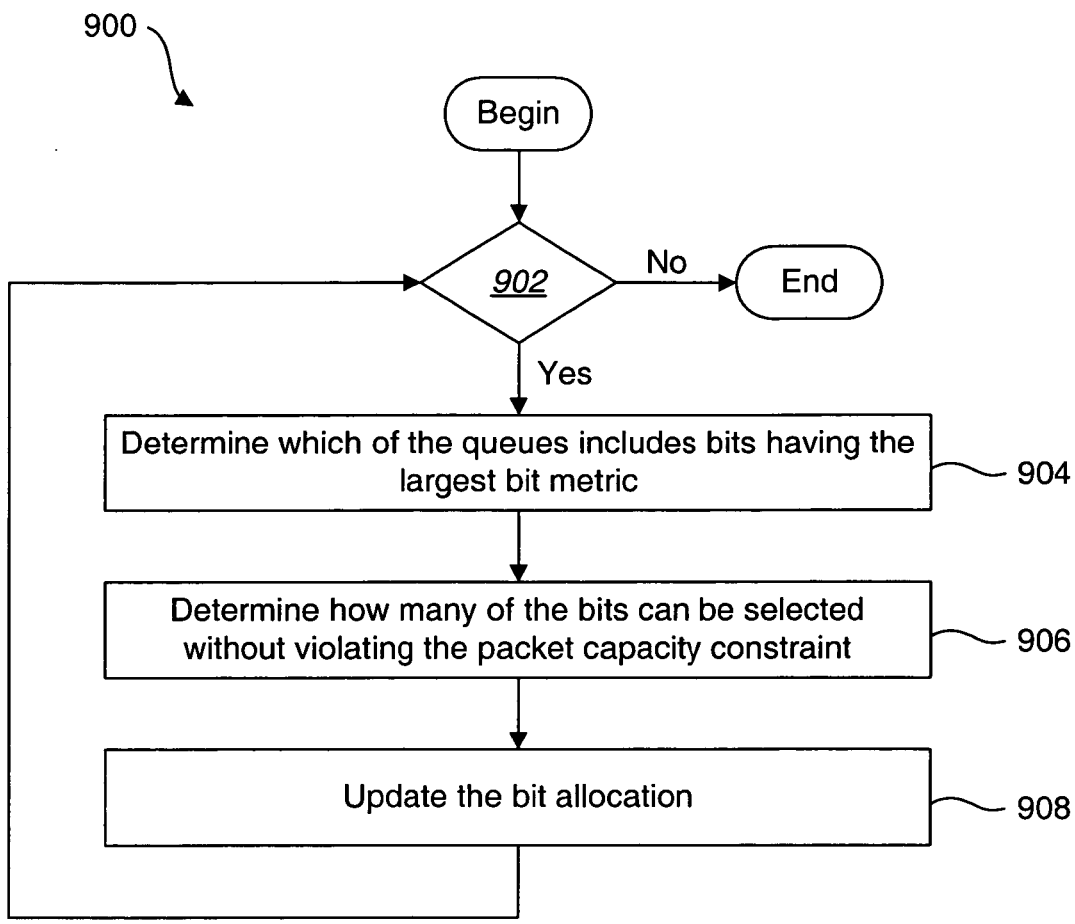
FIG. 9 illustrates another exemplary method that may be performed by the scheduler.

FIG. 9 illustrates an exemplary method 900 that may be performed by the scheduler 214 in order to select bits so that the transmission metric is maximized without violating the packet capacity constraint 532a. In other words, FIG. 9 illustrates an exemplary way that step 804 of the method 800 shown in FIG. 8 may be performed. As before, the steps of the method 900 may be implemented in software, firmware, hardware, or any combination thereof.

The data allocation component 217 determines, at step 902, whether there are any queues from which additional bits may be selected without violating the packet capacity constraint 532a. Mathematically, this may be expressed as determining the following subset of data flows:

$$\Psi = \{1 \leq i \leq N | (b_1, b_2, \ldots, b_i+1, \ldots, b_N) \in C_j\} \qquad (8)$$

In equation 8, the term $C_j$ refers to the packet capacity constraint 532a. If the set $\Psi$ is empty, then the method 900 ends without the other steps being performed.

The data allocation component 217 determines, at step 904, which of the queues includes bits having the largest bit metric. In other words, step 904 involves, among data flows in the set $\Psi$, selecting the data flow index m with the maximum value of bit metric $\alpha_{m,j,b_m+1}$.

The data allocation component 217 determines, at step 906, how many of the bits from the queue 212 identified in step 904 may be selected without violating the packet capacity constraint 532a. Mathematically, step 906 may be expressed as determining the largest number $\delta$ such that $(b_1, b_2, \ldots, b_m+\delta, \ldots, b_N) \in C_j$ and $\alpha_{m,j,b_m+\delta} \geq \alpha_{l,j,b_l+1}$ for any other data flow index l≠m.

The data allocation component 217 updates, at step 908, the bit allocation. Mathematically, step 908 may be expressed as setting the variable $b_m = b_m + \delta$, where $b_m$ is the number of bits allocated from the queue corresponding to data flow m. The method 900 then returns to step 902.

Figure 10:
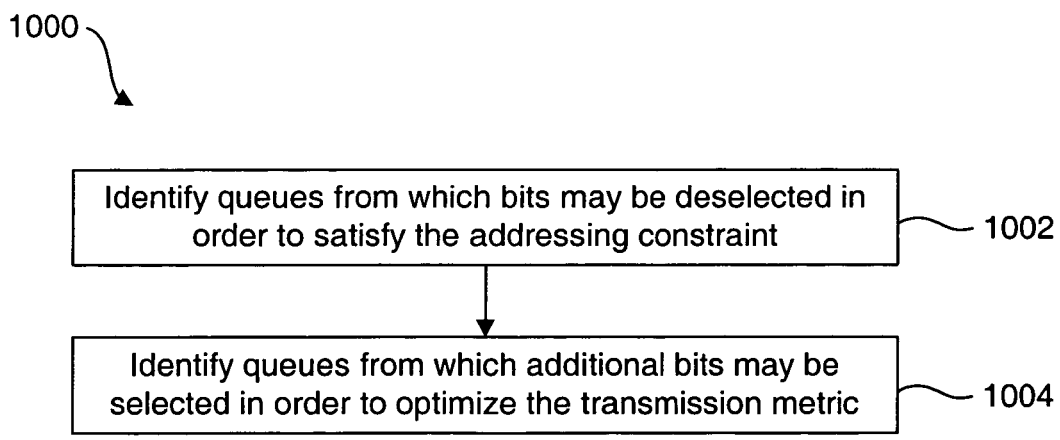
FIG. 10 illustrates another exemplary method that may be performed by the scheduler.

FIG. 10 illustrates an exemplary method 1000 that may be performed by the scheduler 214 in order to adjust the selection of bits so that the transmission metric is maximized without violating the addressing constraint. In other words, FIG. 10 illustrates an exemplary way that step 808 of the method 800 shown in FIG. 8 may be performed. As before, the steps of the method 1000 may be implemented in software, firmware, hardware, or any combination thereof.

The data allocation component 217 identifies, at step 1002, queues 212 from which bits may be deselected in order to satisfy the addressing constraint 532b. Mathematically, step 1002 may be expressed as determining the smallest integers $u_i$ and $d_i$ such that $$\left\lceil \frac{b_i - d_i}{B_{i,j}} \right\rceil < \left\lceil \frac{b_i}{B_{i,j}} \right\rceil.$$

The data flow index m is then identified that minimizes the value of $$\sum_{k=0}^{d_m-1} \alpha_{m,j,b_m-k}.$$

The variable $b_m$ is then set equal to $b_m = b_m - d_m$.

The data allocation component 217 identifies, at step 1004, queues 212 from which additional bits may be selected in order to optimize the transmission metric while still satisfying the addressing constraint 532b. Mathematically, step 1004 may be expressed as for each data flow index i, determining the largest number $u_i$ such that $(b_1, b_2, \ldots, b_i+u_i, \ldots b_N) \in C_j$. In this context, the term $C_j$ refers to the addressing constraint 532b. The data flow index l is then found that maximizes the expression $$\sum_{k=1}^{u_l} \alpha_{l,j,b_{l,j}+k}.$$

The variable $b_l$ is then set equal to $b_l=b_l+u_l$. If l=m, then the method 1000 ends. Otherwise, the method 1000 is repeated.

Figure 11:
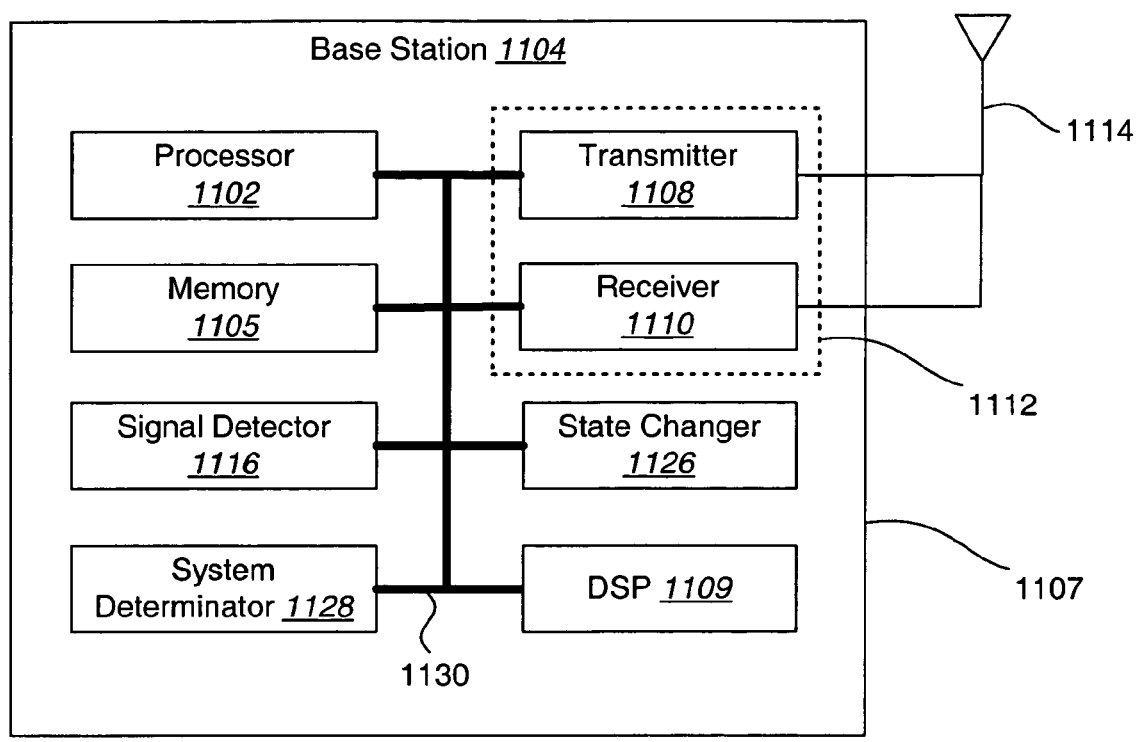
FIG. 11 is a functional block diagram illustrating an embodiment of a base station.

FIG. 11 is a functional block diagram illustrating an embodiment of a base station 1104. The base station 1104 includes a processor 1102 which controls operation of the base station 1104. The processor 1102 may also be referred to as a CPU. Memory 1105, which may include both Read-Only Memory (ROM) and Random Access Memory (RAM), provides instructions and data to the processor 1102. A portion of the memory 1105 may also include Non-Volatile Random Access Memory (NVRAM).

The base station 1104, which may be embodied in a wireless communication device such as a cellular telephone, may also include a housing 1107 that contains a transmitter 1108 and a receiver 1110 to allow transmission and reception of data, such as audio communications, between the base station 1104 and a remote location, such as a remote station 206. The transmitter 1108 and receiver 1110 may be combined into a transceiver 1112. An antenna 1114 is attached to the housing 1107 and electrically coupled to the transceiver 1112. Additional antennas (not shown) may also be used. The operation of the transmitter 1108, receiver 1110 and antenna 1114 is well known in the art and need not be described herein.

The base station 1104 also includes a signal detector 1116 used to detect and quantify the level of signals received by the transceiver 1112. The signal detector 1116 detects such signals as total energy, pilot energy per Pseudo Noise (PN) chips, power spectral density, and other signals, as is known in the art.

A state changer 1126 of the base station 1104 controls the state of the wireless communication device based on a current state and additional signals received by the transceiver 1112 and detected by the signal detector 1116. The wireless communication device is capable of operating in any one of a number of states.

The base station 1104 also includes a system determinator 1128 used to control the wireless communication device and determine which service provider system the wireless communication device should transfer to when it determines the current service provider system is inadequate.

The various components of the base station 1104 are coupled together by a bus system 1130 which may include a power bus, a control signal bus, and a status signal bus in addition to a data bus. However, for the sake of clarity, the various busses are illustrated in FIG. 11 as the bus system 1130. The base station 1104 may also include a Digital Signal Processor (DSP) 1109 for use in processing signals. One skilled in the art will appreciate that the base station 1104 illustrated in FIG. 11 is a functional block diagram rather than a listing of specific components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A base station configured for wireless communication with a plurality of remote stations in a wireless communication system, comprising:

a transmitter for transmitting a forward link to the plurality of remote stations;

a processor; and memory in electronic communication with the processor;
the memory storing instructions being executable to
implement a method comprising:
calculating data metrics for data in a plurality of queues, each queue corresponding to a different data flow in the wireless communication system;
using the data metrics to determine a separate transmission metric for each of a plurality of possible transmission formats, the transmission metric for a given transmission format being dependent on the data metrics corresponding to allocated data for the given transmission format; and
selecting a transmission format that has an optimum transmission metric.

2. The base station of claim 1, wherein the method further comprises transmitting the allocated data for the selected transmission format on the forward link in accordance with the selected transmission format.

3. The base station of claim 1, wherein the allocated data for the given transmission format is determined so that the transmission metric for the given transmission format is optimized in view of one or more constraints.

4. The base station of claim 3, wherein the one or more constraints comprise a packet capacity constraint which specifies that the allocated data for the given transmission format does not exceed a packet's data capacity.

5. The base station of claim 4, wherein the packet capacity constraint for the $j^{th}$ transmission format is expressed as:

$$\sum_{i=1}^{N} \frac{b_i}{G_{i,j}} \leq 1$$

wherein $b_i$ represents the number of allocated bits from the $i^{th}$ queue, and wherein $G_{i,j}$ represents the maximum number of bits from the $i^{th}$ queue that are included in the packet if all channel resources are allocated to the $i^{th}$ data flow.

6. The base station of claim 4, wherein the packet capacity constraint for the $j^{th}$ transmission format is expressed as:

$$\sum_{i=1}^{N} \frac{b_i}{G_{i,j}} \leq 1$$

wherein $b_i$ represents the number of allocated bits for data flows residing on the $i^{th}$ remote station, and wherein $G_{i,j}$ represents the maximum number of bits from data flows residing on the $i^{th}$ remote station that are included in the packet if all channel resources are allocated to data flows residing on the $i^{th}$ remote station.

7. The base station of claim 3, wherein the one or more constraints comprise an addressing constraint which specifies that the allocated data for the given transmission format does not exceed a packet's addressing capacity.

8. The base station of claim 7, wherein the addressing constraint for the plurality of queues is expressed as:

$$\sum_{i=1}^{N} \left\lceil \frac{b_i}{B_{i,j}} \right\rceil \leq K_j$$

wherein $b_i$ represents the number of allocated bits from the $i^{th}$ data flow's queue, wherein $B_{i,j}$ represents the data size at which the $i^{th}$ data flow is treated as multiple virtual data flows for the purpose of addressing, and wherein $K_j$ denotes the maximum number of virtual data flows that may be served at a time by the $j^{th}$ transmission format.

9. The base station of claim 7, wherein the addressing constraint for the $j^{th}$ transmission format is expressed as:

$$\sum_{i=1}^{N} \left\lceil \frac{b_i}{B_{i,j}} \right\rceil \leq K_j$$

wherein $b_i$ represents the number of allocated bits to data flows residing on the $i^{th}$ remote station, wherein $B_{i,j}$ represents the data size at which the $i^{th}$ remote station is treated as multiple virtual remote stations for the purpose of addressing, and wherein $K_j$ denotes the maximum number of virtual remote stations that may be served at a time by the $j^{th}$ transmission format.

10. The base station of claim 1, wherein calculating the data metrics comprises calculating a separate bit metric for each bit in each of the plurality of queues.

11. The base station of claim 10, wherein the bit metric of the $k^{th}$ bit in the $i^{th}$ data flow's queue at time t with respect to transmission format j is expressed as:

$$\alpha_{i,j,k}(t) = \left[ \frac{F(T_{i,k}(t) - T_{desired,i,k}, R_i(t))}{\tau_{i,j}} + G(t + \tau_{i,j} - \tau_{Expedite,i,k}, t + \tau_{i,j} - t_{Arrival,i,k}) \right] \cdot U(\tau_{DROP,i,k} - t - \tau_{i,j})$$

wherein $t_{Arrival,i,k}$ is the arrival time of bit k of the $i^{th}$ data flow's queue;
wherein $t_{DROP,i,k}$ is the deadline of bit k of the $i^{th}$ data flow's queue;
wherein $\tau_{Expedite,i,k}$ is the expedite time of bit k of the $i^{th}$ data flow's queue;
wherein $T_{i,k}(t)$ is the average throughput experienced by the $i^{th}$ data flow's queue containing bit k;
wherein $T_{desired,i,k}$ is the average throughput desired by the $i^{th}$ data flow's queue containing bit k;
wherein $R_i(t)$ is the average sustainable data rate/CQI of the $i^{th}$ data flow's channel based on received DRC/CQI feedback;
wherein $G(x, y)$ is an increasing function of two arguments x and y; and
wherein $U(\cdot)$ is the unit step function.

12. The base station of claim 11, wherein $F(T-T_{desired}, R)$ is expressed as:

$$F(T - T_{desired}, R) = \frac{1}{\max(T - T_{desired}, T_{\min})}.$$

13. The base station of claim 11, wherein $G(x, y)$ is expressed as:

$$G(x,y) = K \cdot U(x) + L \cdot (y-\Delta) U(y-\Delta).$$

14. The base station of claim 1, wherein the transmission metric for the given transmission format is also dependent on a penalty associated with the given transmission format.

15. The base station of claim 1, wherein the transmission metric for transmission format j is expressed as:

$$M_j(t) \equiv \sum_{i=1}^{N} \sum_{k \in \{k_1, k_2, \cdots, k_{b_i}\}} \alpha_{i,j,k}(t) - P_j$$

wherein $\alpha_{i,j,k}(t)$ is a bit metric of the $k^{th}$ bit in the $i^{th}$ data flow's queue at time t with respect to transmission format j; and wherein $P_j$ is a penalty associated with transmission format j.

16. The base station of claim 1, wherein the method further comprises selecting the allocated data for the given transmission format so the transmission metric is optimized without violating a packet capacity constraint.

17. The base station of claim 16, wherein the method further comprises:
   determining that an addressing constraint is violated; and
   in response, adjusting the allocated data so the transmission metric is optimized without violating either the addressing constraint or the packet capacity constraint.

18. The base station of claim 1, wherein the method is performed at each transmission opportunity.

19. The base station of claim 1, wherein the wireless communication system operates in accordance with the 1xEV-DO standard.

20. A base station that is configured for wireless communication, comprising:
   means for calculating data metrics for data in a plurality of queues, each queue corresponding to a different data flow;
   means for using the data metrics to determine a separate transmission metric for each of a plurality of possible transmission formats, the transmission metric for a given transmission format being dependent on the data metrics corresponding to allocated data for the given transmission format;
   means for selecting a transmission format that has an optimum transmission metric; and
   means for transmitting the allocated data for the selected transmission format on the forward link in accordance with the selected transmission format.

21. In a base station that is configured for wireless communication, a method comprising:
   calculating data metrics for data in a plurality of queues, each queue corresponding to a different data flow;
   using the data metrics to determine a separate transmission metric for each of a plurality of possible transmission formats, the transmission metric for a given transmission format being dependent on the data metrics corresponding to allocated data for the given transmission format;
   selecting a transmission format that has an optimum transmission metric; and
   transmitting the allocated data for the selected transmission format on the forward link in accordance with the selected transmission format.

22. An apparatus for wireless communication, comprising:
   a processor; and
   memory in electronic communication with the processor; the memory storing instructions, the instructions that are executable to implement a method comprising:
      calculating data metrics for data in a plurality of queues, each queue corresponding to a different data flow;
      using the data metrics to determine a separate transmission metric for each of a plurality of possible transmission formats, the transmission metric for a given transmission format being dependent on the data metrics corresponding to allocated data for the given transmission format; and
      selecting a transmission format that has an optimum transmission metric.

23. A computer-readable medium for wireless communication comprising instructions executable to:
   calculate data metrics for data in a plurality of queues, each queue corresponding to a different data flow;
   use the data metrics to determine a separate transmission metric for each of a plurality of possible transmission formats, the transmission metric for a given transmission format being dependent on the data metrics corresponding to allocated data for the given transmission format;
   select a transmission format that has an optimum transmission metric; and
   transmit the allocated data for the selected transmission format on the forward link in accordance with the selected transmission format.

* * * * *